United States Patent
Seo

(10) Patent No.: US 7,024,960 B2
(45) Date of Patent: **\*Apr. 11, 2006**

(54) CONNECTING ROD APPARATUS OF HERMETIC COMPRESSOR

(75) Inventor: Seung-don Seo, Gwangju (KR)

(73) Assignee: Samsung Gwangju Electronics Co., Ltd., Gwangju (KR)

( * ) Notice: Subject to any disclaimer, the term of this patent is extended or adjusted under 35 U.S.C. 154(b) by 75 days.

This patent is subject to a terminal disclaimer.

(21) Appl. No.: 10/242,462

(22) Filed: Sep. 13, 2002

(65) Prior Publication Data

US 2003/0075007 A1     Apr. 24, 2003

(30) Foreign Application Priority Data

Oct. 18, 2001     (KR) ................................ 2001-64188

(51) Int. Cl.
*F04B 17/00*     (2006.01)
*F01B 29/00*     (2006.01)
*F16C 7/00*     (2006.01)

(52) U.S. Cl. .................... 74/579 E; 74/579 R; 92/128; 417/415

(58) Field of Classification Search ................. 92/140, 92/128; 74/579 R, 579 E; 403/79; 417/415
See application file for complete search history.

(56) References Cited

U.S. PATENT DOCUMENTS

| | | | | |
|---|---|---|---|---|
| 4,266,443 A | * | 5/1981 | McWhorter ............... | 74/579 E |
| 4,407,168 A | * | 10/1983 | Andrione et al. ......... | 74/579 E |
| 4,770,058 A | * | 9/1988 | Lilie et al. ................ | 74/579 E |
| 4,930,405 A | * | 6/1990 | Lilie .......................... | 92/128 |
| 5,197,416 A | * | 3/1993 | Zoche ....................... | 123/54.2 |
| 5,671,655 A | * | 9/1997 | Vollrath ..................... | 92/128 |
| 5,671,665 A | * | 9/1997 | Kayser et al. ............. | 100/38 |
| 5,799,565 A | * | 9/1998 | Bo .............................. | 92/187 |
| 6,382,081 B1 | * | 5/2002 | Tanaka et al. ............. | 92/128 |
| 6,533,488 B1 | * | 3/2003 | Blenkush et al. .......... | 403/79 |
| 6,729,225 B1 | * | 5/2004 | Seo ............................ | 92/140 |
| 6,739,237 B1 | * | 5/2004 | Seo ............................ | 92/128 |
| 2003/0079604 A1 | * | 5/2003 | Seo ............................ | 92/140 |

FOREIGN PATENT DOCUMENTS

EP     0578 714 B1 *     1/1996     ............... 74/579 E

OTHER PUBLICATIONS

Webster'S II New Riverside University Dictionary 1994, p. 1095.*
Webster'S Third New International Dictionary, 1968, p. 409.*

* cited by examiner

*Primary Examiner*—Vinh T. Luong
(74) *Attorney, Agent, or Firm*—Blank Rome LLP

(57) ABSTRACT

A connecting rod apparatus for converting a rotational motion to a reciprocal linear motion by connecting an eccentric portion of a crank shaft to a piston. The connecting rod apparatus has a bushing, a connecting rod and a connecting member. The bushing is rotatably connected with the eccentric portion, and has a sloping side on its outer surface with a predetermined slope in regard to an axis of the eccentric portion. The connecting rod has a piston attachment formed at one end for being connected with a piston pin which is connected with the piston. A connecting portion is formed at another end of the connecting rod and is connected with the bushing in a direction of the axis along the sloping side of the bushing. The connecting member connects the connecting portion and the bushing so that the connecting portion and the bushing can move relative to one another.

13 Claims, 4 Drawing Sheets

CONNECTING ROD APPARATUS OF HERMETIC COMPRESSOR

FIELD OF THE INVENTION

The present invention relates to a reciprocal hermetic compressor, and more particularly, to a connecting rod apparatus for connecting a crank shaft and a piston in a reciprocal hermetic compressor.

BACKGROUND OF THE INVENTION

Generally, as shown in FIG. 1, a hermetic compressor comprises a motor 1 having a stator 2, a rotor 4 rotatably disposed around the stator 2, a crank shaft 6, a connecting rod 8, and a piston 10.

The crank shaft 6 has an lower eccentric portion 6a that is rotated by the rotor 4. One end of the connecting rod 8 has a great diameter 8a portion which is connected to the eccentric portion 6a, while the other end has a small diameter 8b portion which is connected to the piston 10. The piston 10 moves linearly in a piston chamber 12a of a cylinder 12. Referring to FIG. 2, the great diameter 8a portion has a great inner diameter hole h1 connected with the eccentric portion 6a, and the small diameter 8b portion has a small inner diameter hole h2 connected with a piston pin 11. The great inner diameter hole h1 and the small inner diameter hole h2 are connected by an oil transferring path 8c.

In the above structure, the rotor 4 rotates the crank shaft 6 and the eccentric portion 6a. The connecting rod 8 converts the eccentric rotation of the eccentric portion 6a to a linear reciprocal motion of the piston 10. In other words, the reciprocal hermetic compressor is constructed to convert the rotation of the motor 1 to a linear movement of the piston 10.

In the meantime, the crank shaft 6 of the hermetic compressor forms a 90° angle with the connecting rod 8 when crossing the connecting rod 8. The 90° angle is an important element in the design of the compressor because it allows for maximum power transmitting efficiency. In order to ensure 90° angle, the permissible variations in the dimensions of related machine parts have to be known, and thus, it has been a general practice to disclose the tolerances of the related parts.

In addition, the piston 10 slides keeping an appropriate clearance in the piston chamber 12a in the cylinder 12, and also at a constant angle, i.e., 90°, with respect to the axis of the crank shaft 6.

It is important that the piston 10 forms a right angle with the piston pin 11. It is also important that axes of great inner diameter hole h1 and small inner diameter hole h2 are at a parallel relation with each other.

As described so far, various connecting relationships based on the connecting rod 8 have been described. In particular, the relationship between the connecting rod 8 and the crank shaft 6 affects the driving capability of the compressor. Accordingly, when the connecting rod 8 is misaligned or unstable with respect to the crank shaft 6, increased friction and abrasion between the elements is generated and the compressor may not operate normally. The problem is particularly aggravated when the crank shaft 6 and the piston 10 are not mechanically aligned.

Thus, there is a need to improve the reliability of the compressor by compensating for alignment errors in a connecting rod that converts the rotary motion of the crank shaft 6 to a linear motion in a piston.

SUMMARY OF THE INVENTION

The object of the present invention is to provide a connecting rod apparatus for a reciprocal hermetic compressor having an improved structure to compensate for the misalignment of a crank shaft and a piston.

The above object is accomplished by providing a connecting rod apparatus that connects an eccentric portion of a crank shaft to a piston and converts a rotary motion to a reciprocal linear motion. The connecting rod apparatus comprises a connecting rod, a bushing, and a connecting member. The connecting rod has a piston attachment formed at one end that is connected to a piston pin of a piston. The connecting rod includes a connecting portion on its other end for being connected with the bushing. The bushing is rotatably connected to the eccentric portion of the crank shaft and has a sloping side with a predetermined slope at an outer surface. The connecting member secures the connecting portion and the bushing to one another.

The bushing comprises a cylindrical body connected with the eccentric portion of the crank shaft. An outer surface of the cylindrical body includes a plurality of protrusions at equally spaced intervals and a side having a sloped face.

The connecting portion of the connecting rod comprises a pair of support arms extending from the connecting rod to form a generally U-shaped structure, and a connecting groove formed on an inside surface of each of the support arms corresponding to the protrusions on the outer surface of the bushing.

Additionally, the connecting portion has a sloping portion corresponding to the sloping side of the bushing, the sloping portion contacting the sloping side when the connecting portion is connected to the bushing. The sloping side and the sloping portion have a preferred angle of 3° to 5° with respect to a central axis of the bushing and connecting portion.

The connecting member comprises a metal wire having a predetermined shape and strength in order to clamp the bushing to the connection portion. The connecting member includes a plurality of supporting portions that extend symmetrically from a clamping portion and support a lower part of the bushing. The connecting member also includes an end portion that clamps to the connecting portion. In the preferred embodiment, the wire has a diameter of less than 1.5 mm.

BRIEF DESCRIPTION OF THE DRAWINGS

The object and the feature of the present invention will be more apparent by describing the preferred embodiments of the present invention by referring to the appended drawings, in which.

DETAILED DESCRIPTION OF THE INVENTION

Hereinbelow, the preferred embodiments of the present invention will be described in detail by referring to the appended drawings.

Figure 1:
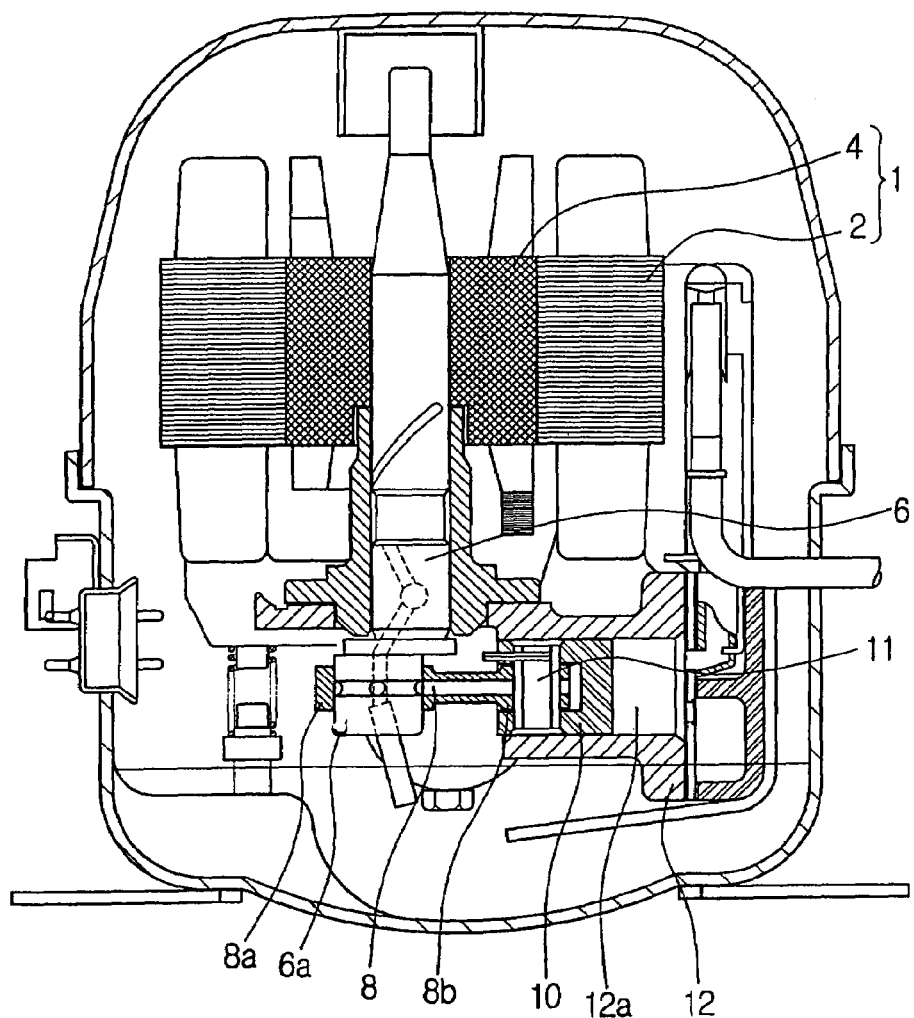
FIG. 1 is a sectional view schematically showing a conventional reciprocal hermetic compressor.
Figure 2:
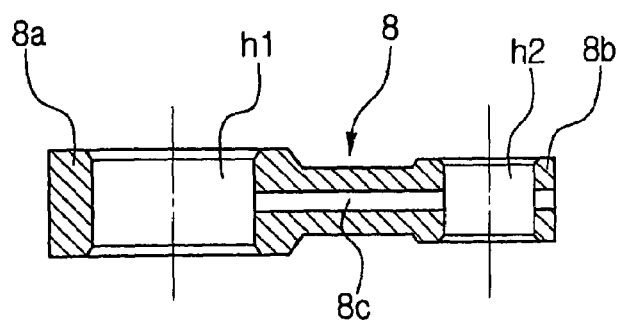
FIG. 2 is a sectional view schematically showing a connecting rod from FIG. 1.
Figure 3:
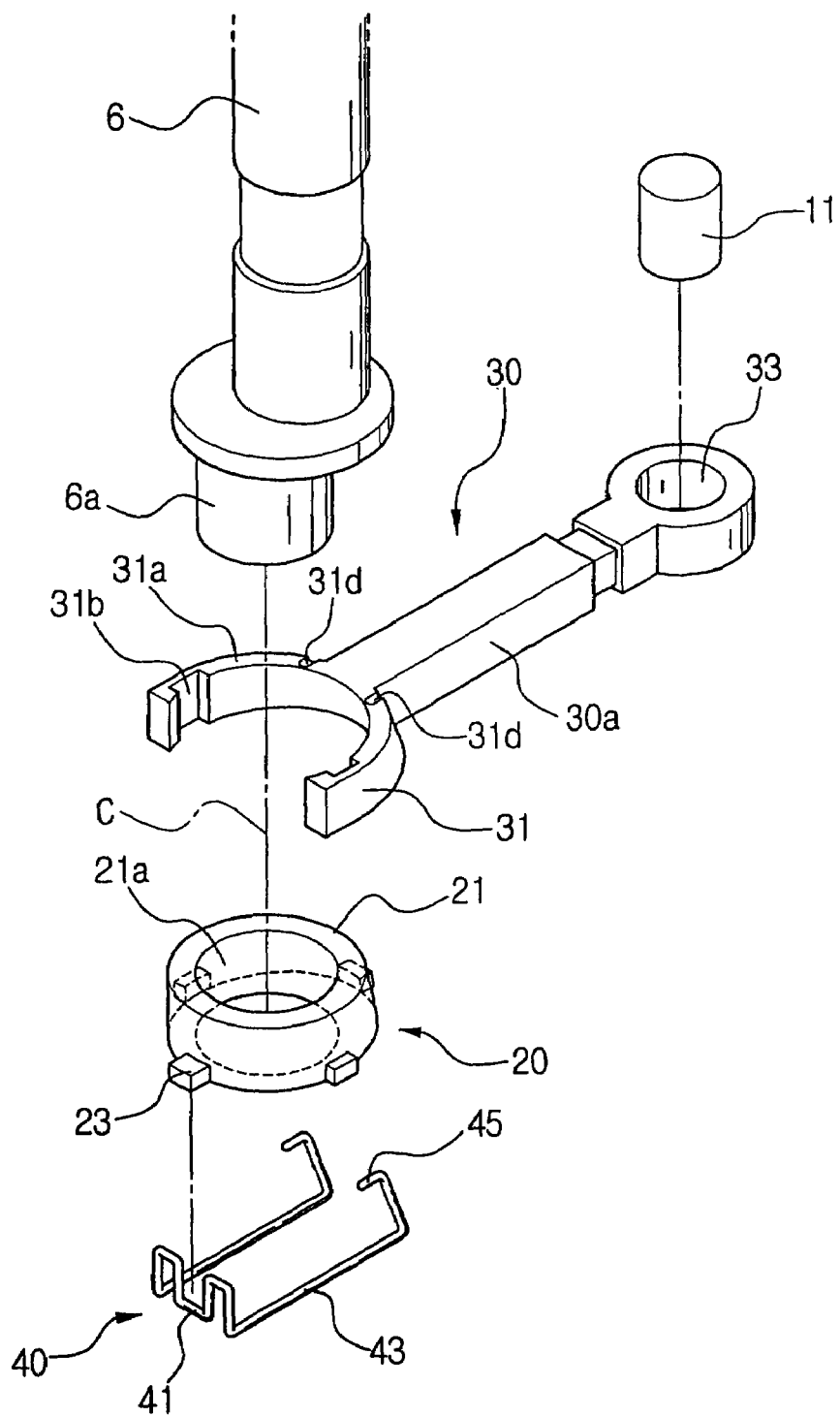
FIG. 3 is an exploded perspective view schematically showing a connecting rod of a reciprocal hermetic compressor according to the present invention.

Referring to FIG. 3, a connecting rod apparatus of a reciprocal hermetic compressor according to the preferred embodiment of the present invention is shown having a bushing 20, a connecting rod 30, and a connecting member 40.

The bushing 20 is rotatably connected with an eccentric portion 6a of a crank shaft 6. The bushing 20 includes a cylindrical shaped body 21 having an inner diameter or bore 21a connected with the eccentric portion 6a, and a plurality of protrusions 23 projecting from an outer surface of the body 21. Each of the protrusions 23 is formed at equally spaced intervals so as to be generally symmetrical about a centerline C of the inner diameter or bore 21a. The body 21 defines an outer circumference 24 that is eccentric with respect to centerline C, as seen in FIG. 4.

Figure 4:
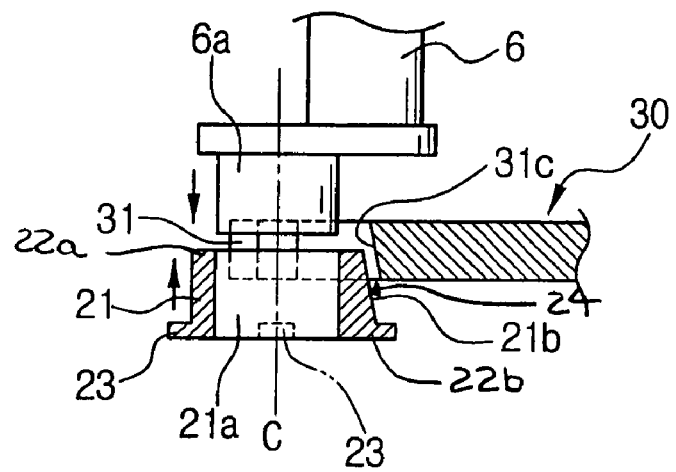
FIG. 4 is a sectional view showing the connecting rod of FIG. 3.

Moreover, as shown in FIG. 4, the outer surface of the body 21 has a sloping side 21b sloped at a predetermined angle from a first end 22a to a second end 22b and facing the connecting rod 30. It is preferable that the sloping side 21b has a slope of 3° to 5° from the centerline axis C of the eccentric portion 6a, which also coincides with the axis of the bushing 20, when assembled.

The connecting rod 30 has a connecting portion 31 formed at one end for being connected to the outside of the body 21, and a piston attachment 33 formed at another end for being connected to a piston pin 11. The connecting portion 31 is connected to the sloping side 21b of the bushing 20 by placing the connecting portion 31 over the bushing 20 and axially sliding the two into engagement. The connecting portion 31 has one pair of support bars 31a diverging from one end of a cylindrical body 30a to form the arms of a generally U-shaped connecting portion 31, and a pair of connecting grooves 31b formed at an inner circumference of the support bars 31a.

Moreover, FIG. 4 shows a sloping portion 31c, corresponding to the sloping side 21b of the bushing 20, formed on the inside surface of the connecting portion 31. It is preferred that the sloping portion 31c have a slope of 3° to 5° from the centerline axis C.

Furthermore, the connecting grooves 31b are formed at intervals corresponding to the protrusions 23 on the bushing 20. In the above construction, the bushing 20 and the connecting portion 31 are connected by moving the bushing 20 and the connecting portion 31 axially toward each other. Therefore, when the sloping side 21b and the sloping portion 31c are first connected a gap exists between the sloping side 21b of the bushing 20 and the sloping portion 31c of the connecting portion 31. However, after the sloping side 21b and the sloping portion 31c are completely connected, the gap disappears.

In addition, a pair of locking recesses 31d are formed at the connection area of the body 30a and the connecting portion 31 so that the connecting member 40 can secure the bushing 20 to the connecting rod 30. In the preferred embodiment, the connecting member 40 is a metal wire having a predetermined shape and strength, the wire having a diameter less than 1.5 mm. However, the connecting member 40 may be made from materials other than metal, so long as it has the requisite strength to hold the bushing 20 to the connecting rod 30.

The connecting member 40 has a clamping portion 41 to clamp the protrusions 23 of the bushing 20, a plurality of support portions 43 extending from the clamping portion 41 in order to support a lower part of the bushing 20, and a pair of end portions 45 extending from the support portions 43 in order to engage the locking recesses 31d.

Figure 5:
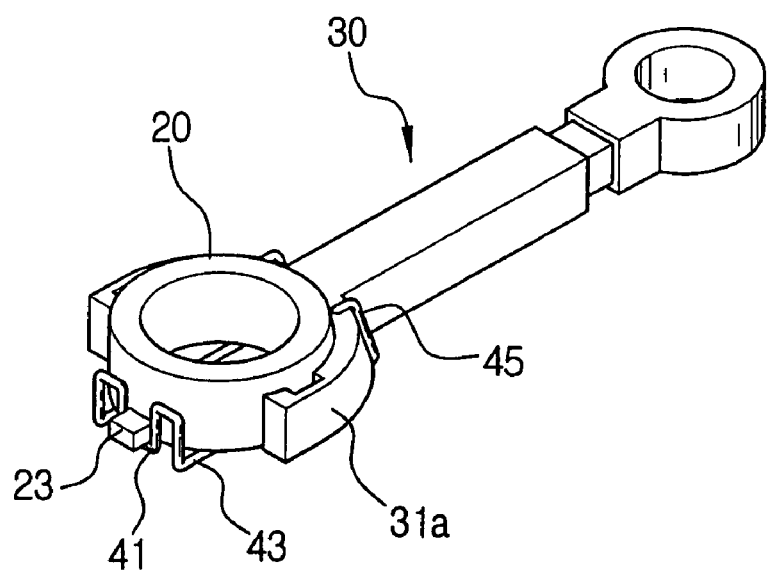
FIG. 5 is a perspective view showing the connecting rod of FIG. 3.

FIG. 5 shows the clamping portion 41 of the connecting member 40 gripping the sides of the protrusion 23. The support portions 43 support the bushing 20 at its bottom surface and the end portions 45 wrap around the connecting portion 31 to secure the bushing 20 to the connecting portion 31. The support portions 43 prevent the bushing from being separated from the bottom of the connecting portion 31.

In the connecting rod apparatus of the hermetic compressor according to the preferred embodiment of the present invention, the bushing 20 and the connecting portion 31 are connected by sliding them in the direction of their axis toward each other.

In addition, as shown in FIG. 5, the bushing 20 and the connecting portion 31 are connected by using the connecting member 40. The bushing 20 is supported by the connecting member 40 and prevented from being separated through the bottom of the connecting portion 31. The bushing 20 is also prevented from separating through the top of the connecting portion 31 due to the engagement of the sloping side 21b with the sloping portion 31c. Also, the connecting member 40 is made of metal wire that is strong enough to hold a predetermined tension. Therefore, if the eccentric portion 6a of the crank shaft 6 and the axis of the piston are misaligned, the misalignment is corrected by the tension of the connecting member 40.

Furthermore, as crank shaft 6 drives the reciprocal motion of the piston, the friction and the abrasion between the connecting rod 30 and the bushing 20 can be reduced. Accordingly, noise generated due to the friction and the abrasion of the connecting rod 30 and the bushing 20 can be reduced.

Figure 6:
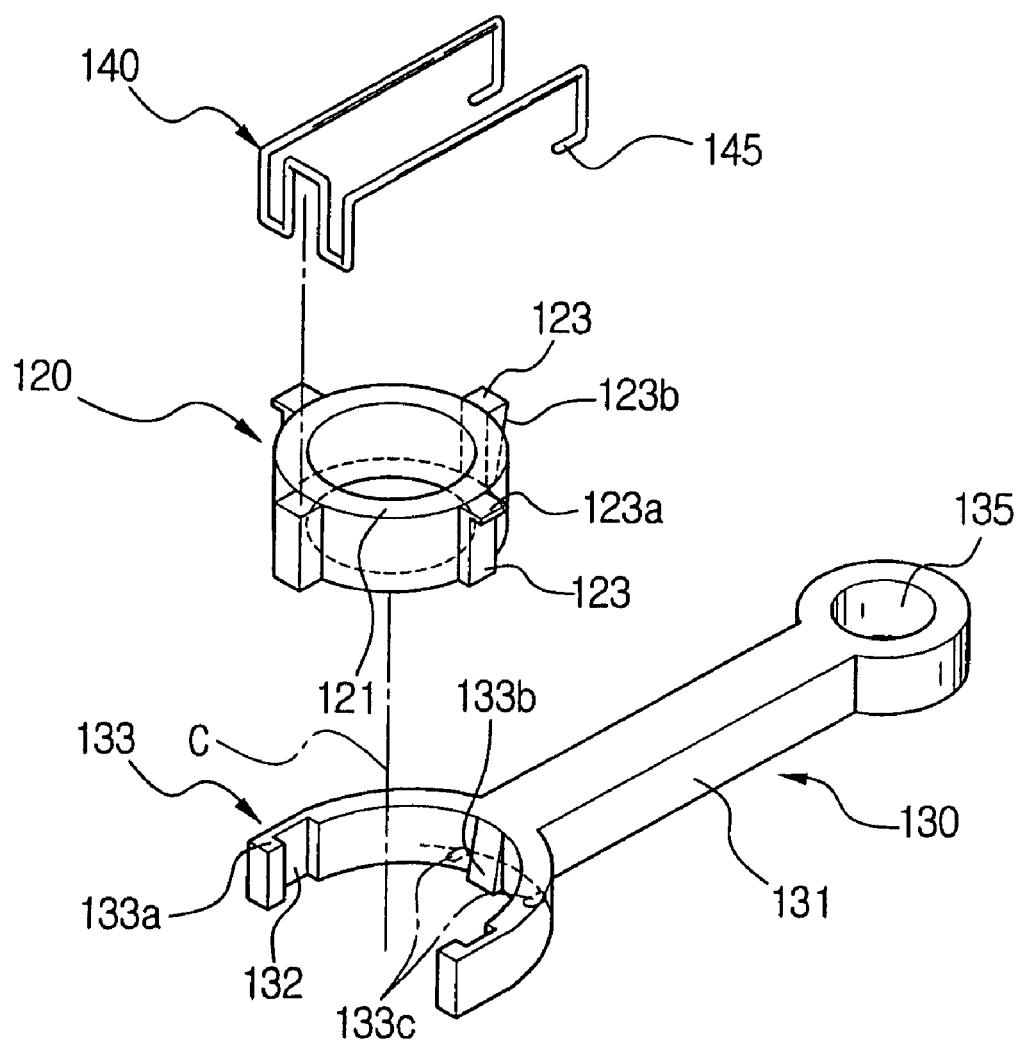
FIG. 6 is an exploded perspective view showing the connecting rod of a reciprocal hermetic compressor according to second preferred embodiment of the present invention.

FIG. 6 is a plan view schematically showing the connecting rod apparatus of the reciprocal hermetic compressor according to a second preferred embodiment of the present invention. Here, the connecting rod apparatus comprises a connecting rod 130 having a U-shaped connecting portion 133 on one end of a body 131, a bushing 120 connected to the connecting portion 133 of the connecting rod 130, and a connecting member 140.

A piston attachment 135 connected with the piston pin is formed at another end of the connecting rod 130. A pair of bent portions 133a are formed at the ends of the connecting portion 133 so as to face each other. A sloping portion 133b protrudes from an inside surface of the connecting portion 133. It is preferred that the sloping portion 133b has a slope of 3° to 5° from an axis C of the bushing 120. Moreover, a pair of locking recesses 133c (shown in hidden lines) are formed on a bottom surface of the boundary of the connecting portion 133 and the body 131. The locking recesses 133c engage the end portions 145 of the connecting member 140 to lock the bushing 120 to the connecting portion 133.

The bushing 120 has a cylindrical body 121 and a plurality of protrusions 123 formed symmetrically around on an outside surface of the body 121. One of the protrusions 123 has a sloping side 123b. The sloping side 123b faces the sloping portion 133b and engage one another when the bushing 120 and the connecting rod 130 are connected. In addition, the rest of the protrusions 123 have a flange 123a formed at an upper end. The bushing 120 is slidably connected to the connecting portion 133 by being slid from an upper part to a lower part of the connecting portion 133. The protrusions 123 are guided by grooves 132 in the support bars 133a. The flange 123a prevents the bushing 120 from sliding completely through the connecting portion 133. When the flange 123a is secured at the upper part of the connecting portion 133, and the sloping side 123b is adhered to the sloping portion 133a, the bushing 120 is prevented from being separated through the lower part of the connecting portion 133.

The connecting member 140 is identical to the connecting member 40 shown in FIG. 5, and connects the bushing 120 and the connecting rod 130. However, here, the connecting member 140 connects a top portion of the bushing 120 and the connecting portion 133 to prevent the bushing 120 from being separated from the connecting portion 133.

The connecting method and the operation of the connecting rod according to the second preferred embodiment of the present invention is omitted here, since the connecting method and the operation are the same as the connecting rod apparatus shown in FIG. 3.

According to the connecting rod apparatus of the reciprocal hermetic compressor according to the present invention, the bushing is slidably connected with the eccentric portion of the crank shaft and the connecting portion of the connecting rod. Moreover, when connected, the sloping side and the sloping portion are firmly secured against each other. Therefore, when the compressor is being operated, the noise caused by the friction and the abrasion due to the gap between the bushing and the connecting rod is prevented.

Furthermore, as the bushing and the connecting rod are connected with each other by the connecting member, the misalignment of the crank shaft and the piston can be compensated for by the connecting member. Accordingly, the reliability of the apparatus is improved.

The preferred embodiments of the present invention have been illustrated and described. However, the present invention is not limited to the preferred embodiments described here, and one skilled in the art may modify the present invention without departing from the spirit or scope of the invention.

What is claimed is:

1. A connecting rod apparatus for converting a rotation to a reciprocal linear motion by connecting an eccentric portion of a crank shaft to a piston, comprising:
   a bushing having a cylindrical body having first and second opposite ends and an inner bore defining a central axis, the cylindrical body having a sloping side at an outer surface sloping from the first end to the second end with the body defining an outer circumference that is eccentric from the central axis, and being rotatably connected to the eccentric portion of the crank shaft, the sloping side having a predetermined slope;
   a connecting rod having a piston attachment formed at one end of the connecting rod for being connected with a piston pin connected with the piston, and a connecting portion formed at another end of the connecting rod for being connected with the bushing; and
   a connecting member connecting the connecting portion of the connecting rod and the bushing so that the connecting portion and the bushing can move relative to one another.

2. The connecting rod apparatus of claim 1, wherein the cylindrical body includes an inner diameter connected with the eccentric portion; and
   wherein said sloping side is on an outer surface of said cylindrical body and one or more protrusions are formed at intervals on said outer surface of said cylindrical body.

3. The connecting rod apparatus of claim 1, wherein the connecting portion comprises:
   a pair of supporting portions diverging from one end of the cylindrical body to form a generally U-shaped configuration; and
   a bent portion bent from an end of the supporting portions for guiding the connection of the bushing.

4. The connecting rod apparatus of claim 1, wherein
   the connecting portion has a sloping portion corresponding to the sloping side of the bushing, and the sloping side and the sloping portion are slidably connected with each other.

5. The connecting rod apparatus of claim 4, wherein
   the sloping side and the sloping portion have an angle of 3° to 5° with respect to the central axis of the eccentric portion.

6. The connecting rod apparatus of claim 1, wherein the connecting portion comprises:
   a pair of supporting portions diverged from one end of the cylindrical body to form a generally U-shaped configuration; and
   a connecting groove formed on an inside surface of each of the supporting portions and corresponding to protrusions at an outer surface of the bushing.

7. The connecting rod apparatus of claim 1, wherein
   the connecting member is a wire having a predetermined thickness in order to combine the connection portion and the bushing.

8. The connecting rod apparatus of claim 7, wherein the wire has a diameter less than 1.5 mm.

9. The connecting rod apparatus of claim 2, wherein the connecting member comprises:
   a clamping portion for clamping a protrusion of the bushing;
   a plurality of supporting portions for wrapping and supporting a lower part of the bushing, the supporting portions extending from the clamping portion; and
   an end portion for wrapping and clamping the connecting portion, the end portion extending from the supporting portions,
   wherein the bushing is supported by the connecting member and prevented from being separated through a lower part of the connecting portion.

10. A connecting rod apparatus, comprising:
    a bushing having a body with opposite first and second ends, said first end having an outer circumference that is smaller than an outer circumference defined by said second end, a substantially cylindrical inner bore extending between said first and second ends, and an outer sloping side extending from said first end to said second end, said inner bore being adapted to receive a portion of a crank shaft;
    a connecting rod rotatably coupled to said bushing at a first end thereof and having an opposite second end connectable to a portion of a piston; and
    a connecting member coupling said bushing and said connecting rod.

11. A connecting rod according to claim 10, wherein
    said body of said bushing has an outer circumference that is eccentric to a central axis defined by said inner bore.

12. A connecting rod according to claim 10, wherein
    the portion of the crank shaft received in the inner bore is an eccentric portion.

13. A connecting rod according to claim 10, wherein
    said first end of said connecting rod has a sloping portion corresponding to said sloping side of said bushing, and said sloping side and said sloping portion are slidable connected with each other.

* * * * *